(12) United States Patent
Kang et al.

(10) Patent No.: US 12,005,816 B2
(45) Date of Patent: Jun. 11, 2024

(54) DUAL RELEASE ACTUATOR FOR VEHICLE SEAT

(71) Applicant: DAS CO., LTD, Gyeongju-si (KR)

(72) Inventors: Sung Won Kang, Incheon (KR); In Yong Park, Incheon (KR); Ji Haeng Jung, Incheon (KR); Kwang Sin Lee, Hwaseong-si (KR); Kwang Su Moon, Hwaseong-si (KR); Jae Yong Lee, Siheung-si (KR); Ju Youl Kim, Busan (KR)

(73) Assignee: DAS CO., LTD., Gyeongju-si (KR)

( * ) Notice: Subject to any disclaimer, the term of this patent is extended or adjusted under 35 U.S.C. 154(b) by 0 days.

(21) Appl. No.: 18/153,520

(22) Filed: Jan. 12, 2023

(65) Prior Publication Data

US 2023/0406160 A1     Dec. 21, 2023

(30) Foreign Application Priority Data

Jun. 20, 2022   (KR) ........................ 10-2022-0074724

(51) Int. Cl.
*B60N 2/02*     (2006.01)
(52) U.S. Cl.
CPC ...... *B60N 2/02246* (2023.08); *B60N 2/02253* (2023.08)

(58) Field of Classification Search
CPC .......................... B60N 2/0224; B60N 2/02253
See application file for complete search history.

(56) References Cited

FOREIGN PATENT DOCUMENTS

| DE | 102017204679 A1 | 5/2018 |
|----|-----------------|--------|
| KR | 1020200062734 A | 6/2020 |
| KR | 1020210140928 A | 11/2021 |
| WO | 2016134746 A1 | 9/2016 |

OTHER PUBLICATIONS

DE Office Action for corresponding DE Application No. 102023101169.3, dated Feb. 12, 2024, 7 pgs.

*Primary Examiner* — Thomas C Diaz
(74) *Attorney, Agent, or Firm* — TAROLLI, SUNDHEIM, COVELL & TUMMINO L.L.P.

(57) ABSTRACT

The present disclosure provides a dual release actuator for a vehicle seat according to the present disclosure, since the first latch release cable and the second latch release cable are disposed on one side of the worm wheel gear and the third latch release cable is disposed on another side of the worm wheel gear, the walk-in latch and the folder-lock latch may be simultaneously released using the first latch release cable and the second latch release cable without connecting a separate distributor.

17 Claims, 14 Drawing Sheets

[FIG. 1]
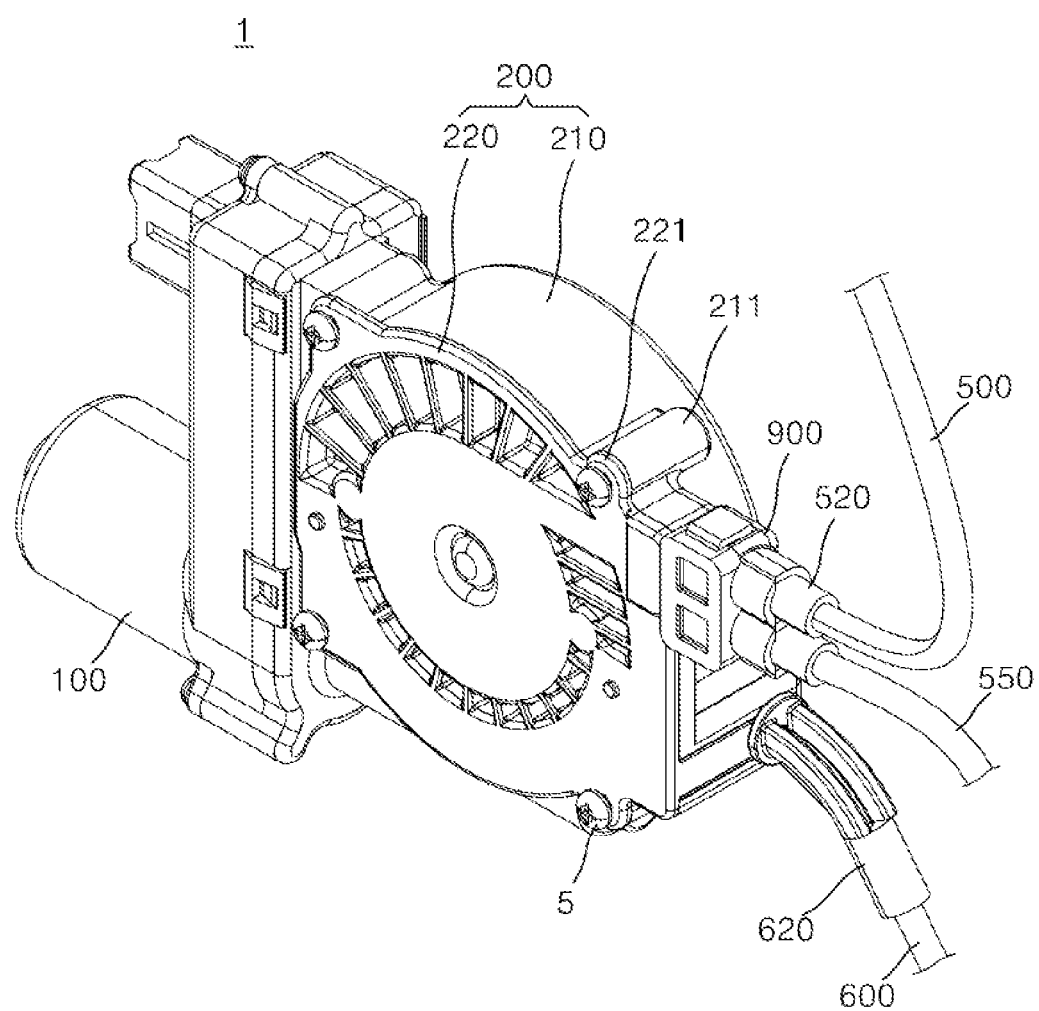

[FIG. 2]
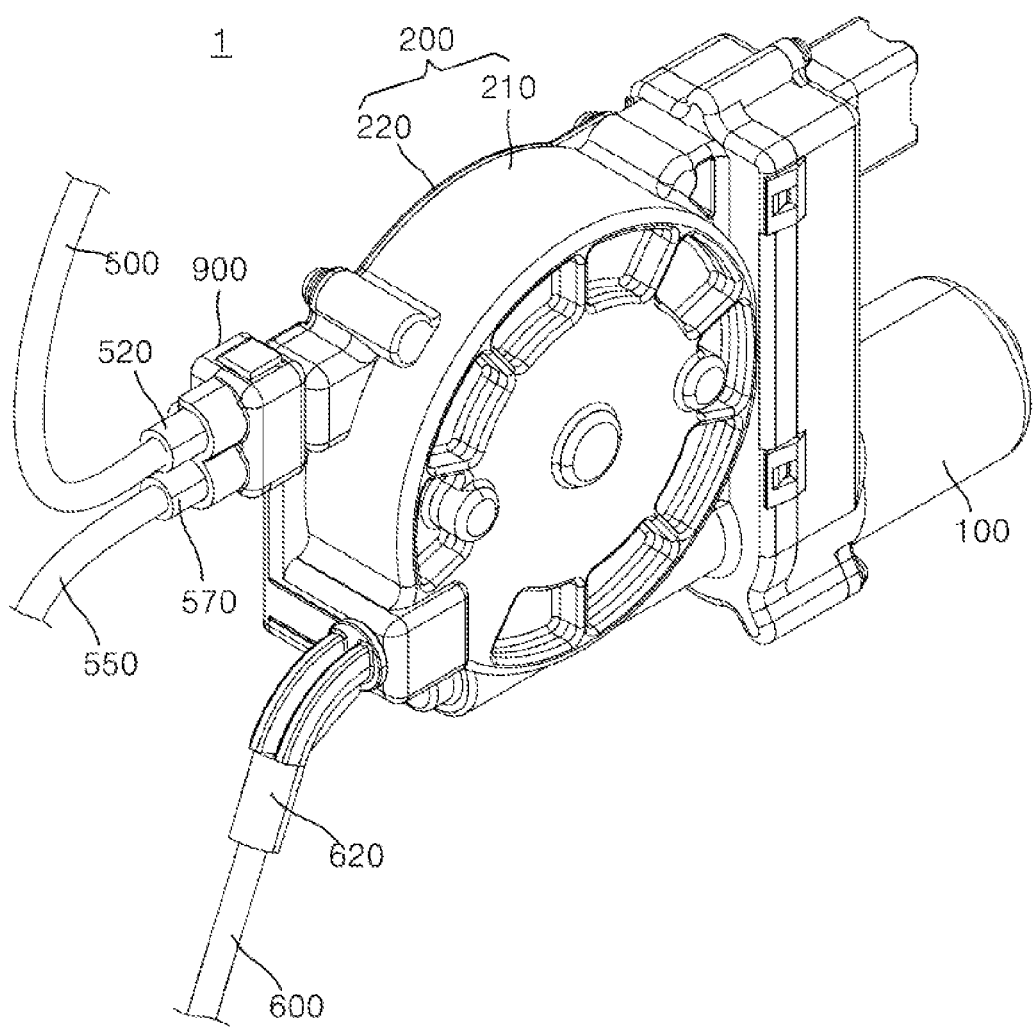

[FIG. 3]
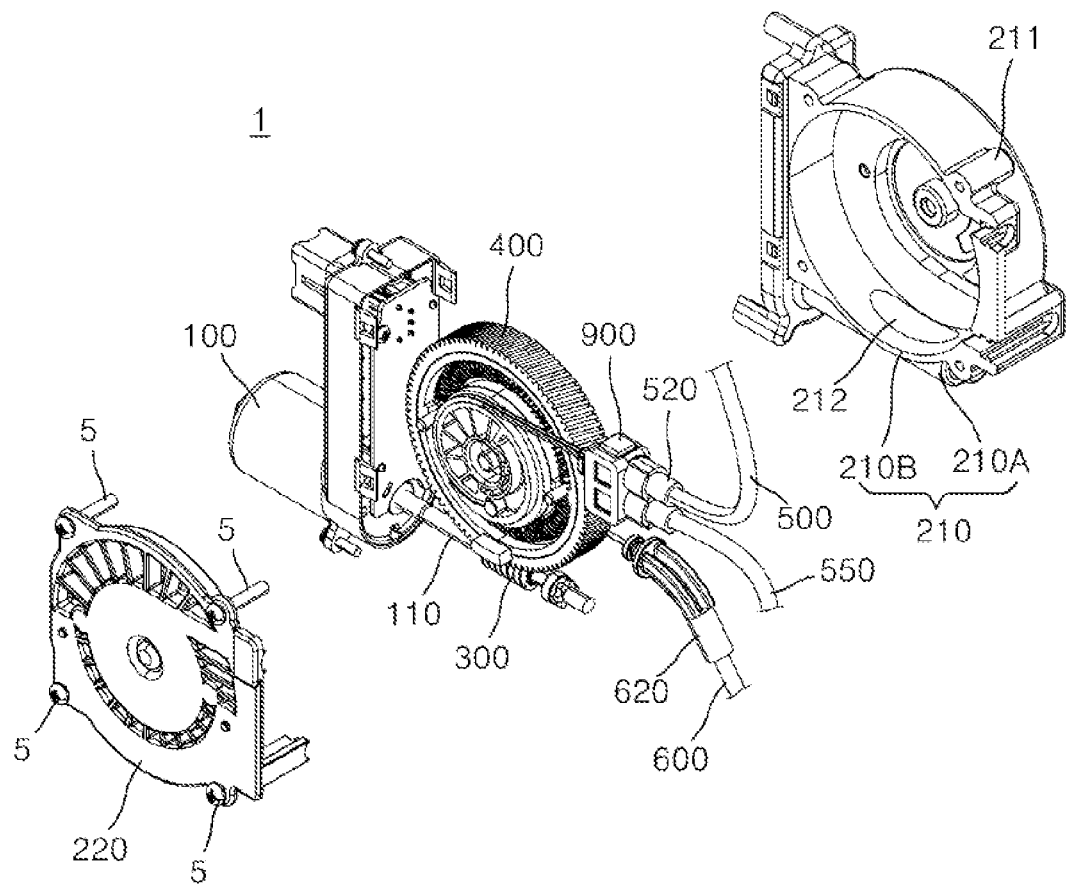

[FIG. 4]
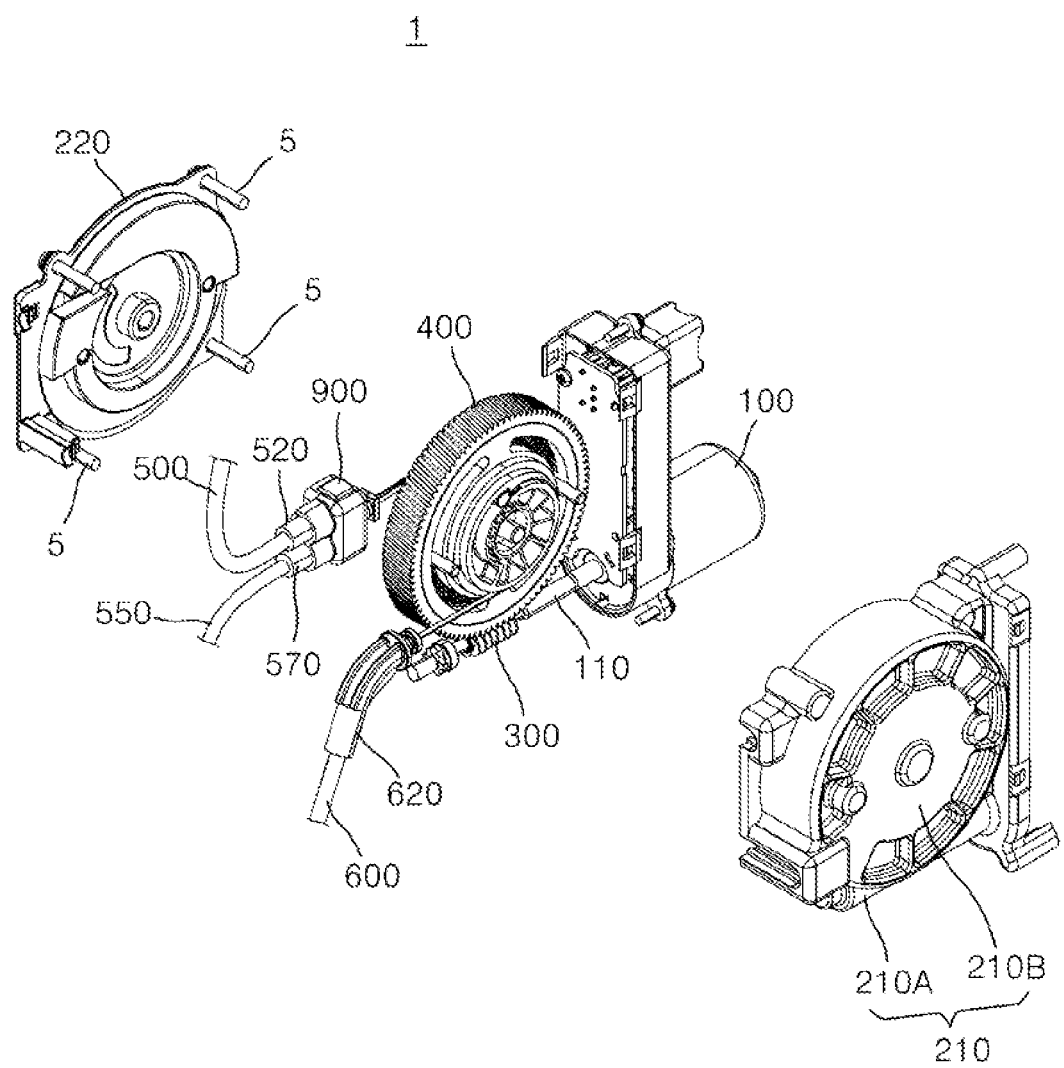

[FIG. 5]
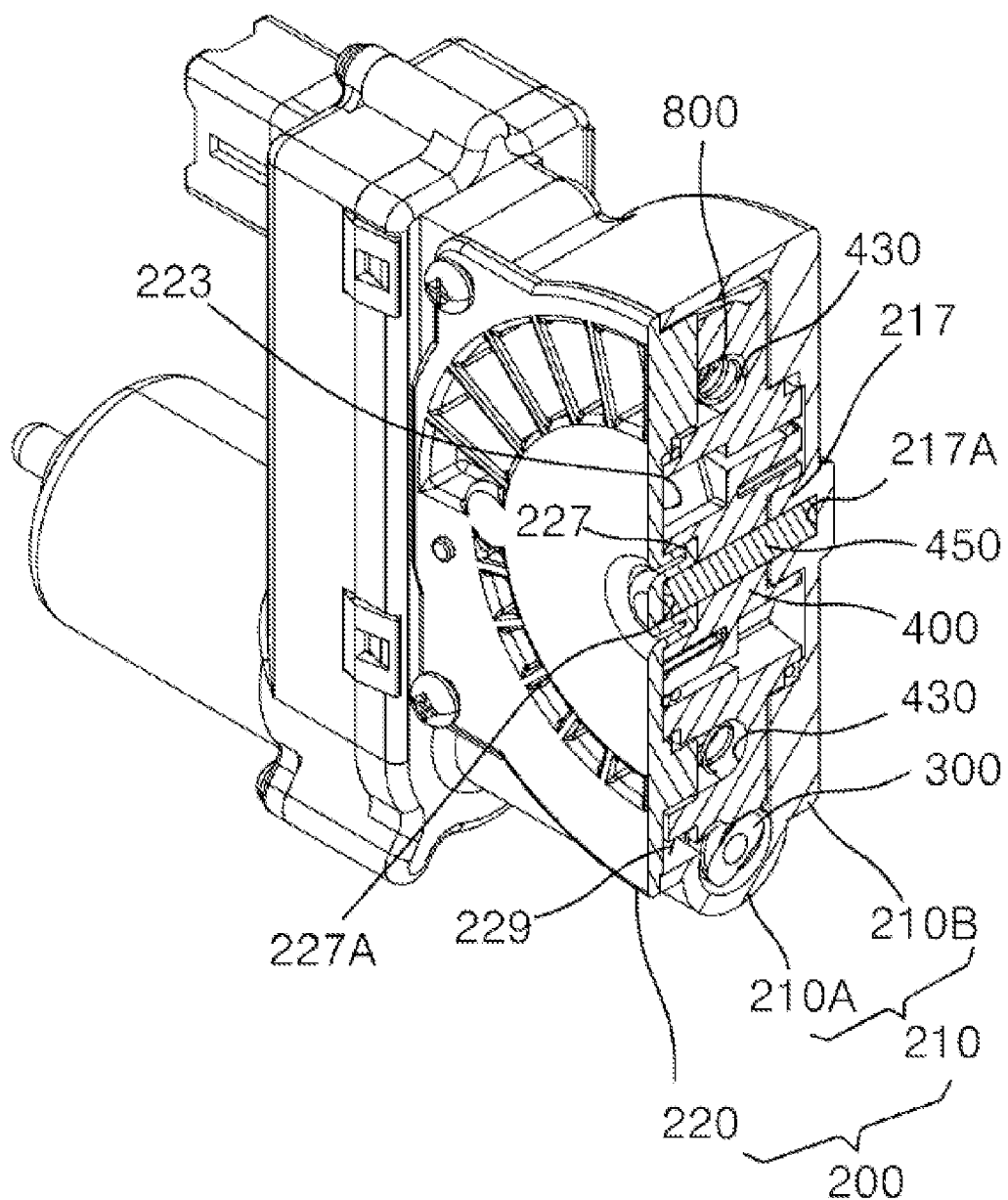

[FIG. 6]
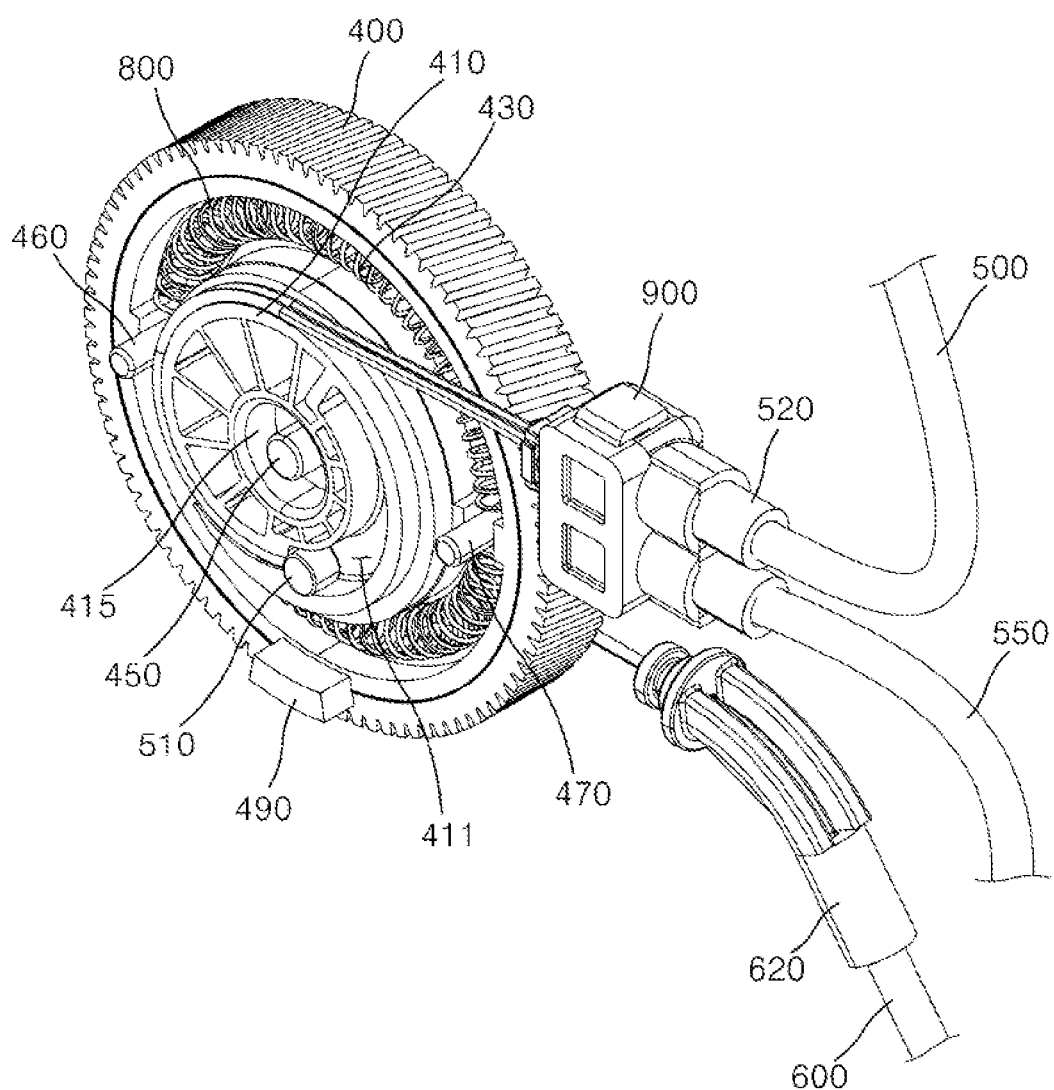

[FIG. 7]
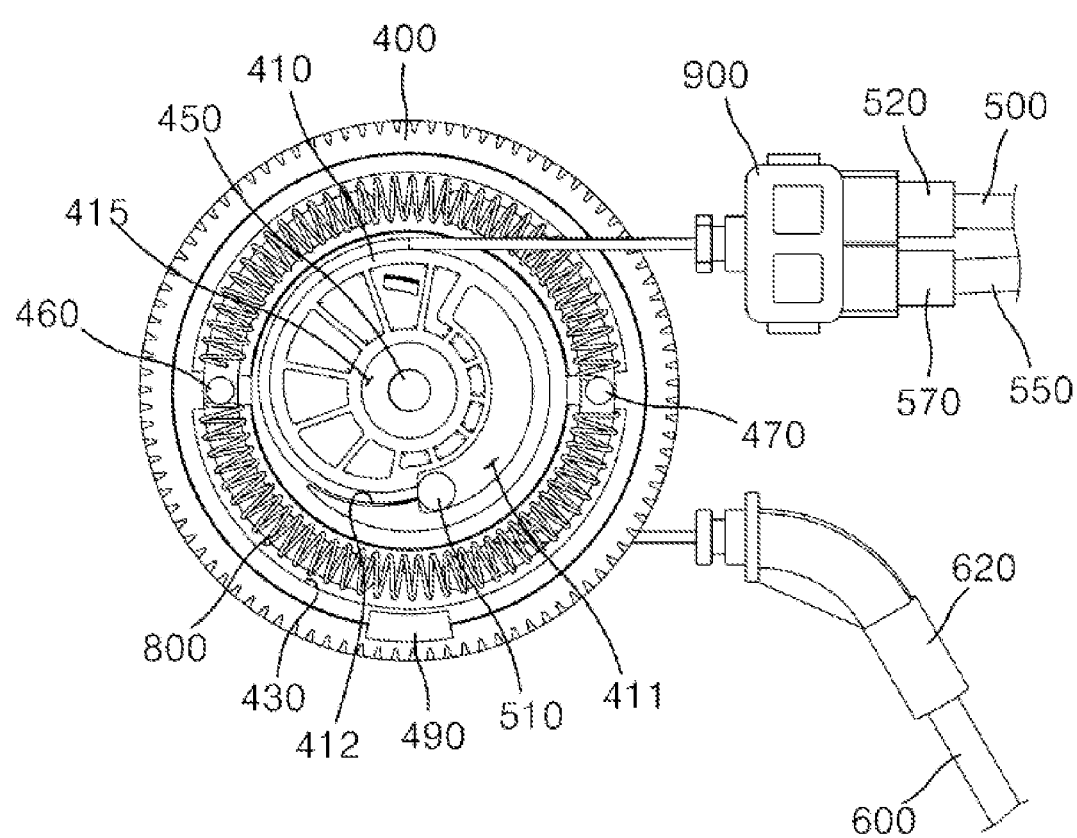

[FIG. 8]
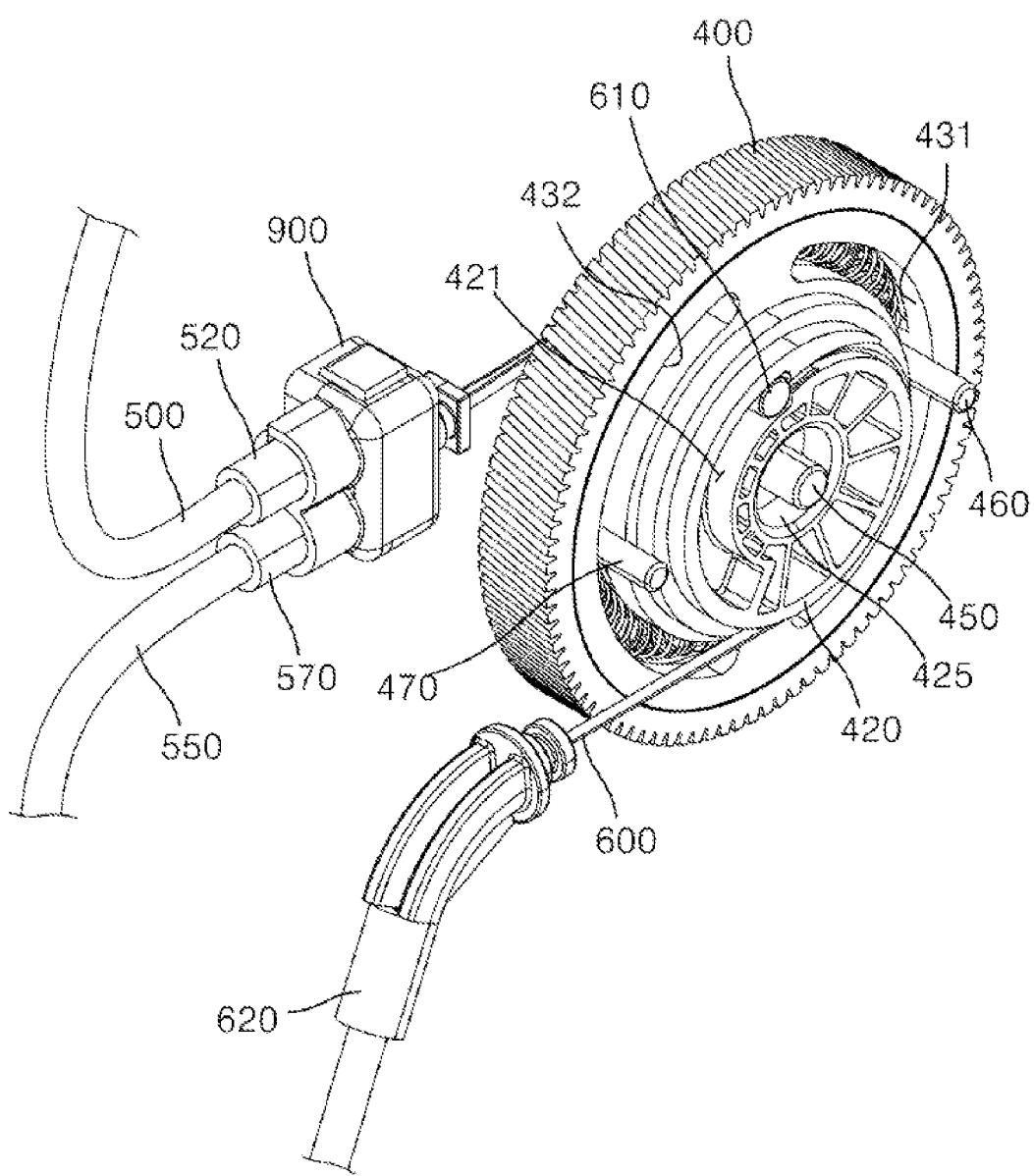

[FIG. 9]
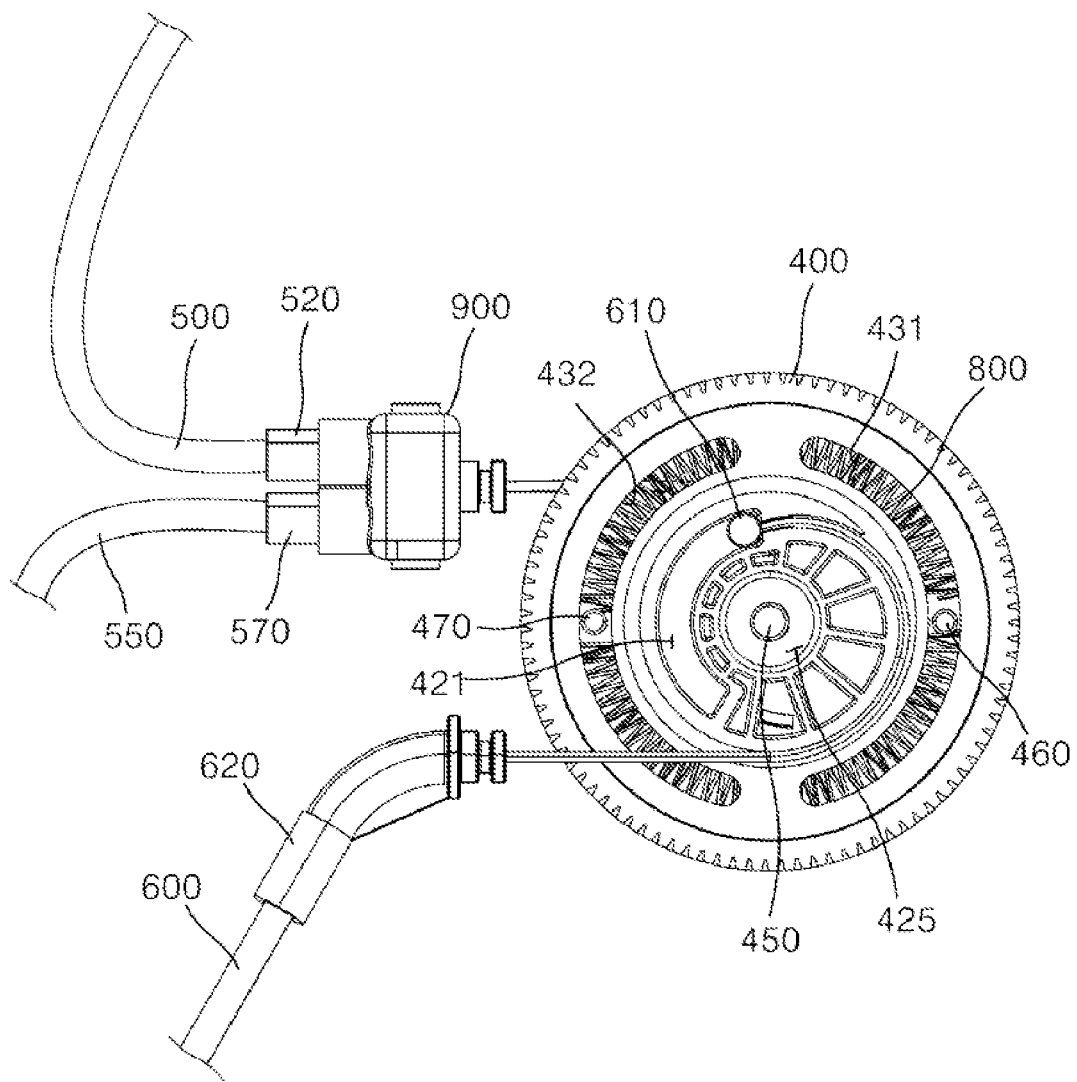

[FIG. 10]
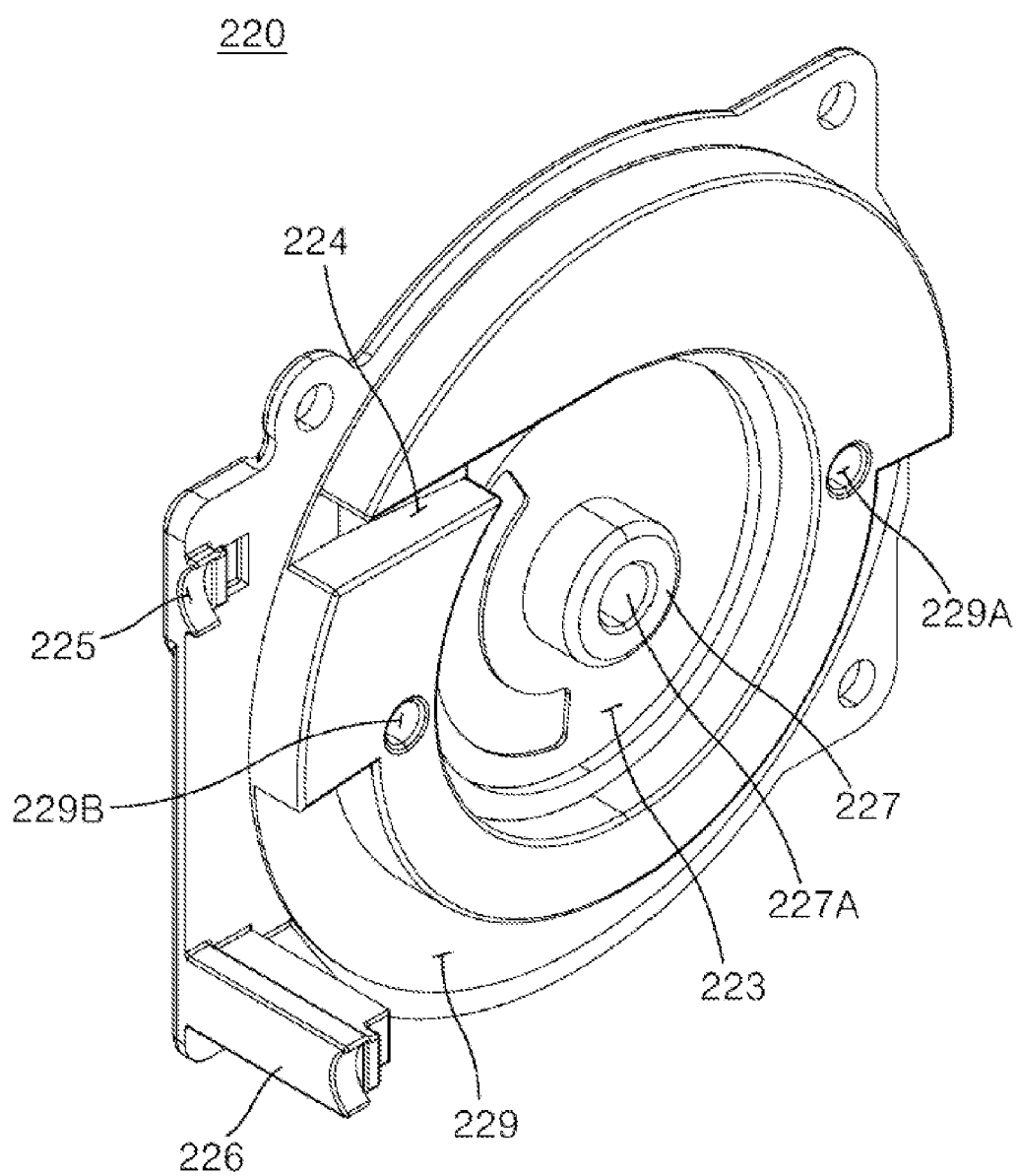

[FIG. 11]
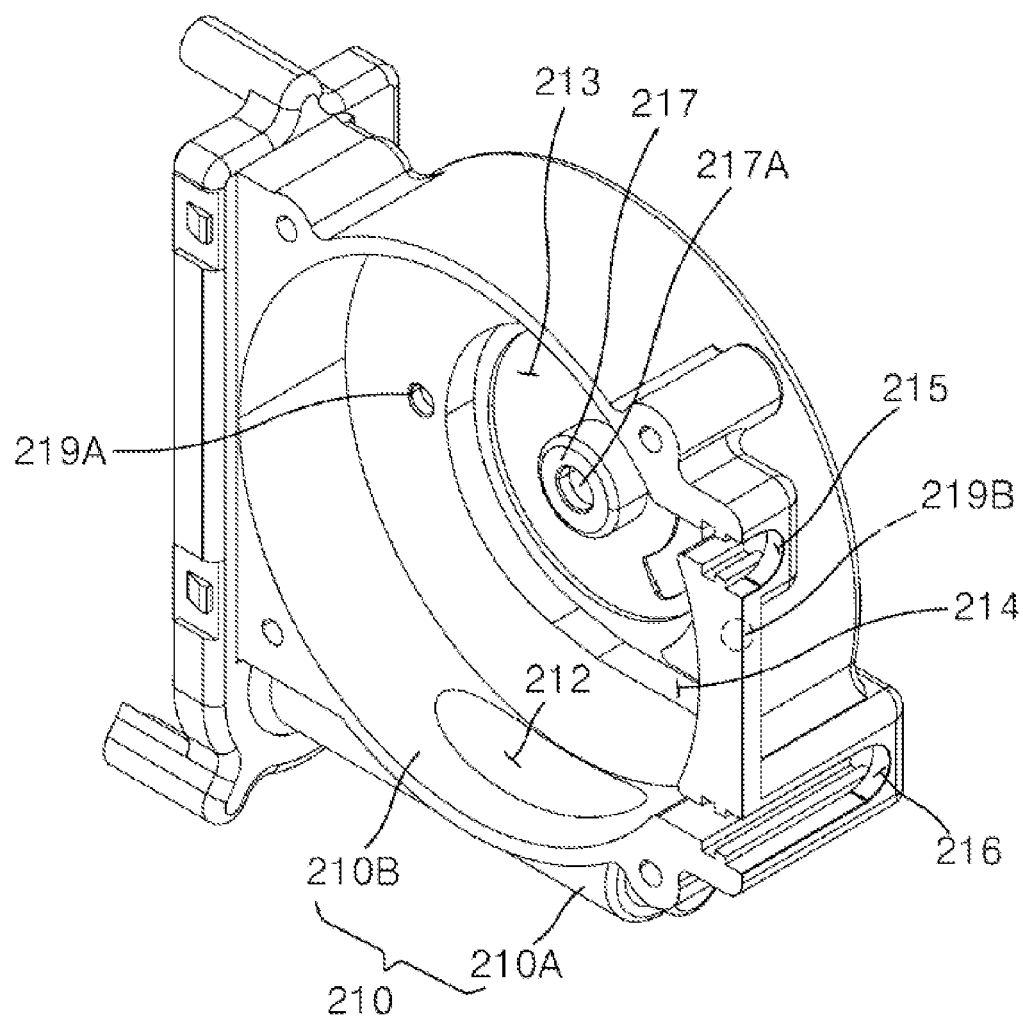

[FIG. 12]
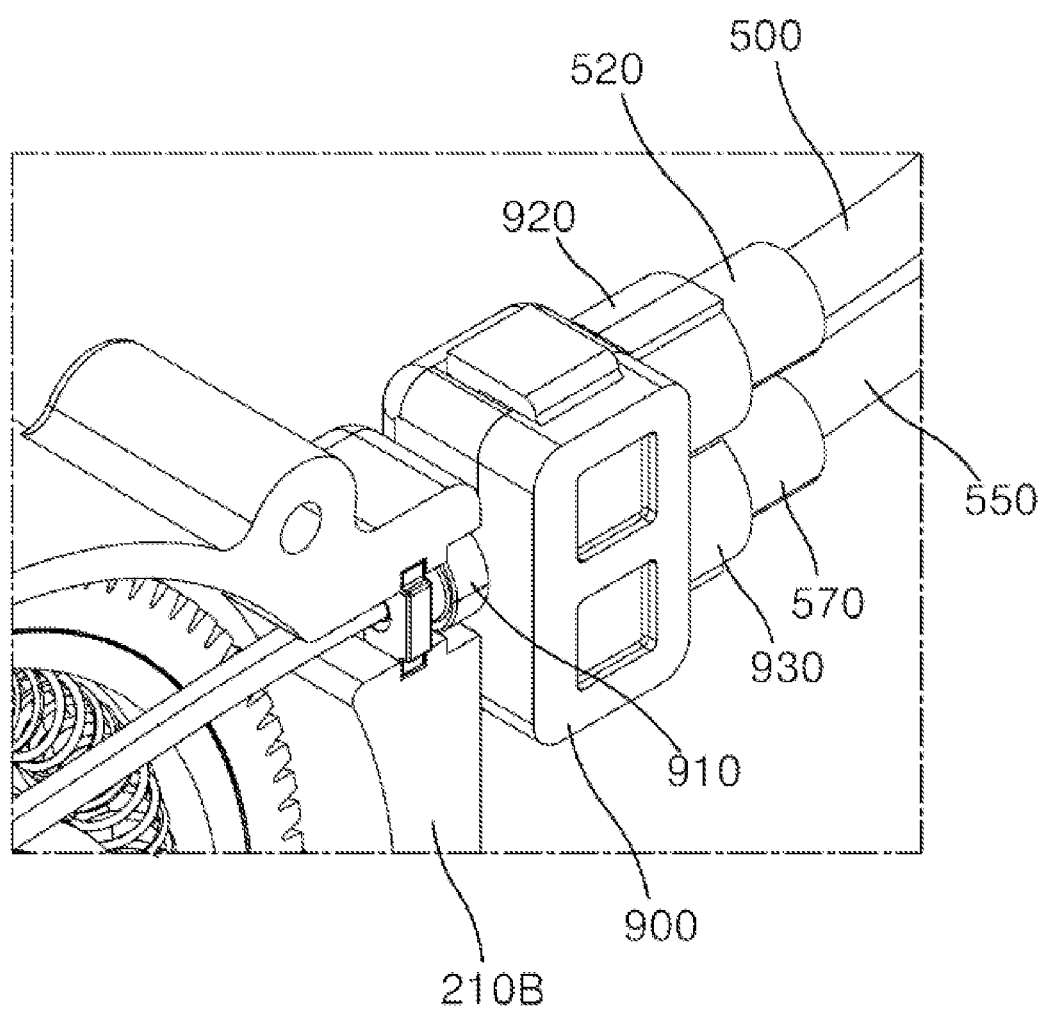

[FIG. 13]
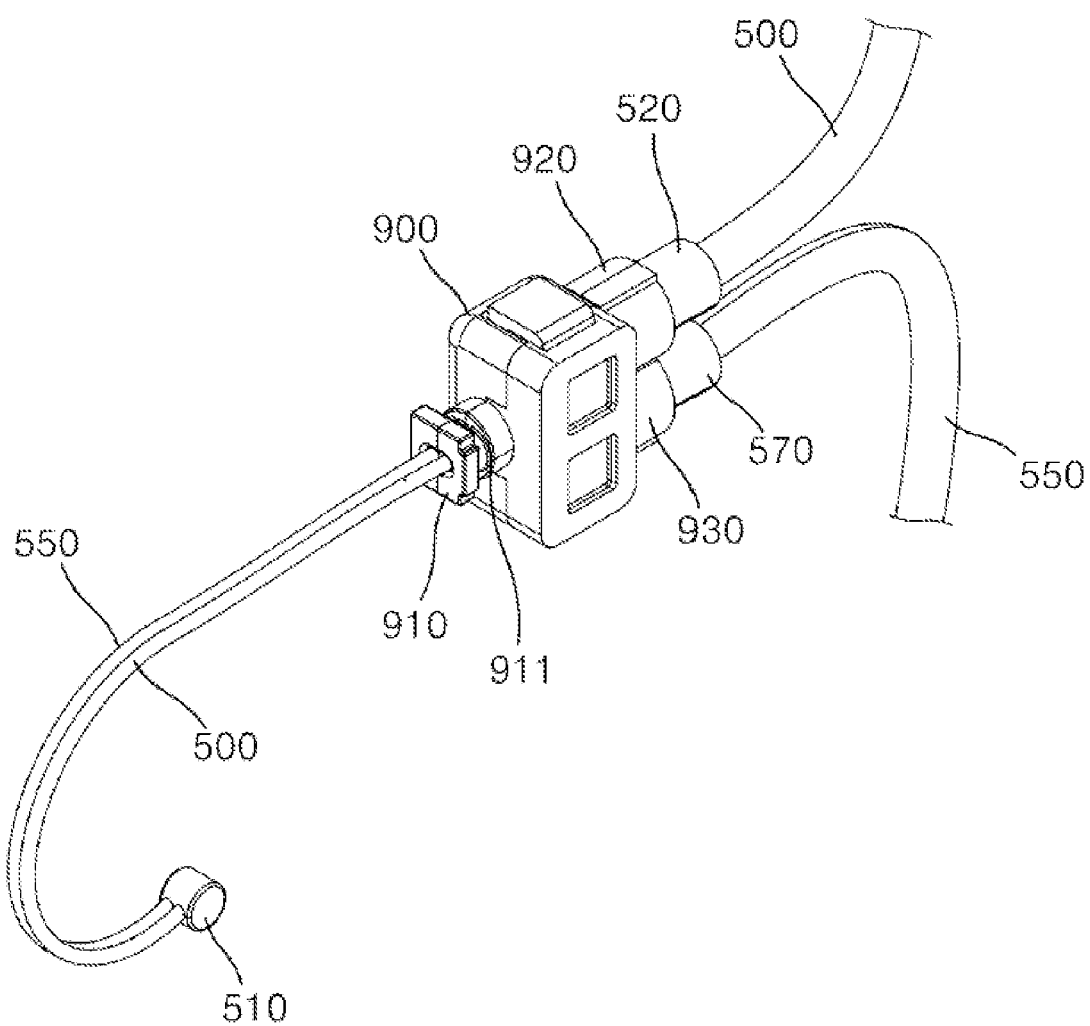

[FIG. 14]
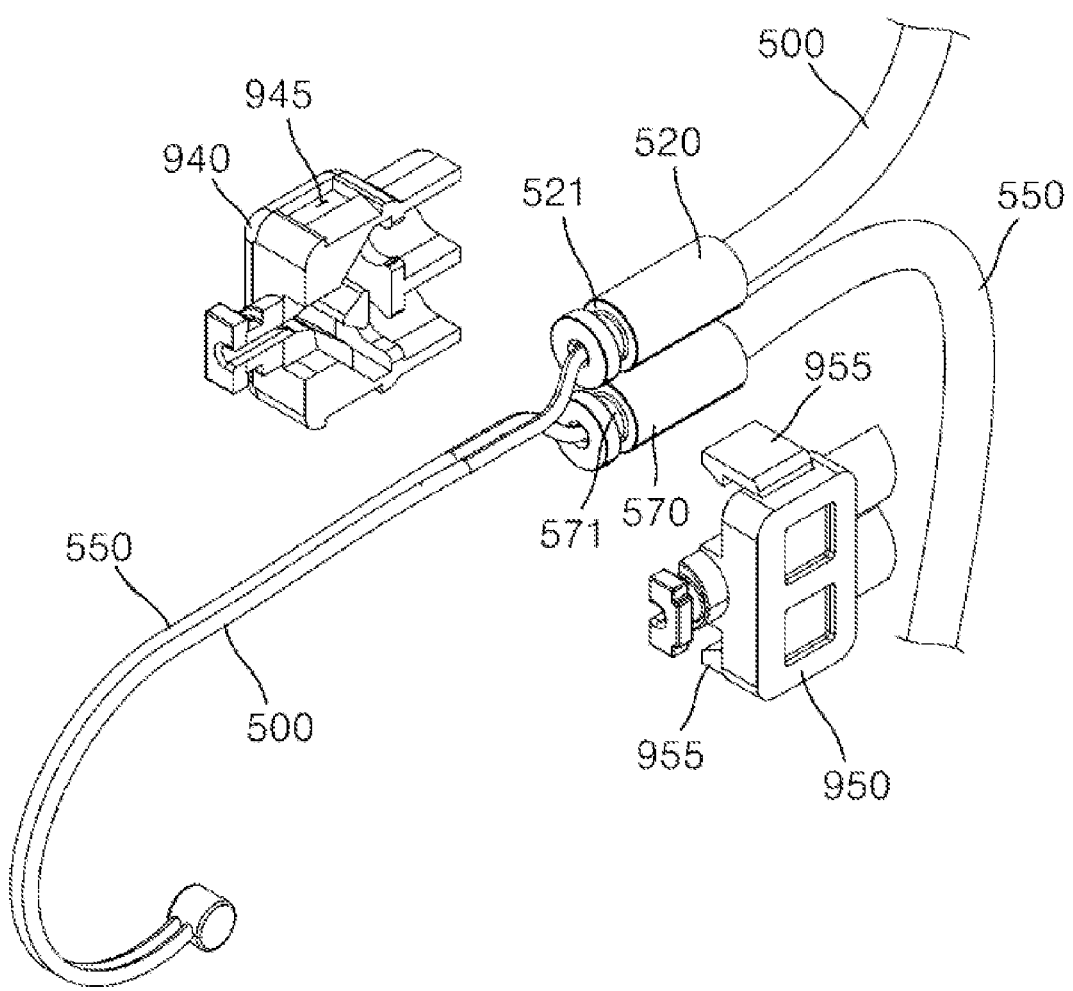

DUAL RELEASE ACTUATOR FOR VEHICLE SEAT

CROSS REFERENCE TO RELATED APPLICATION

The present application claims priority to Korea Patent Application No. 10-2022-0074724, filed Jun. 20, 2022, the entire contents of which is incorporated herein for all purposes by this reference.

FIELD

The present disclosure relates to a dual release actuator for a vehicle seat, and more particularly, to a dual release actuator for a vehicle seat that releases a walk-in latch that locks sliding of a seat back and forth and releases a folder-lock latch that locks tilting of a seatback.

BACKGROUND

In general, in vehicles such as SUVs or RVs equipped with three or more rows of seats, a second-row seat has a walk-in function that slides the entire seats forward so that passengers can easily get on and off from the rear, and a folding function that rotates forward and folds a backrest of a seat so as to load cargo and the like.

To enable the walk-in function and the folding function, the general second-row seat is configured in such a way that a seat can slide in the front and rear directions on a seat rail, and the backrest can be tilted forward or backward. In addition, when the sliding of the seat and the tilting adjustment of the backrest are completed, the walk-in latch and the folder-lock latch are locked, and a sliding position of the seat and a tilting angle of the backrest are fixed.

That is, the walk-in latch and the folder-lock latch are embedded in the seat, and sliding of the seat and tilting of the backrest become possible after the walk-in latch and the folder-lock latch are released.

A walk-in latch release actuator and a folder-lock latch release actuator are separately installed in the seat, the walk-in latch is connected to a cable of the walk-in latch release actuator, and the folder-lock latch is connected to a cable of the folder-lock latch release actuator.

Therefore, when a user wants to use the seat walk-in or backrest folding function, by pressing a switch that drives any one of the walk-in latch release actuator and the folder-lock latch release actuator, and releasing a lock by pulling a cable of any one of the walk-in latch and the folder-lock latch, the seat may be slid back and forth or the backrest may be tilted. Further, when the pressing of the switch is released, the cable of any one actuator is moved to its original position by the elastic force of the spring provided in the one actuator, thereby restoring the one latch to a locked state.

Recently, a dual release actuator having a cable connected to the walk-in latch and a cable connected to the folder-lock latch has been developed.

As an example of the dual release actuator, Korean Patent Laid-Open Publication No. 10-2020-0062734 (published on Jun. 4, 2020) (hereinafter referred to as 'PRIOR ART') discloses 'dual release actuator of seat for vehicle'.

The prior art includes an actuator, a first gear rotated by the actuator and a second gear rotated in engagement with the first gear, a reduction unit outputting rotational force of the second gear in a reduced state, a first guide line and a second guide line formed to be spaced apart in a circumferential direction, a carrier drum rotated by the reduction unit, a first cable having one end connected to a walk-in latch selectively restraining a walk-in operation of a sheet and another end disposed movably along the first guideline and moving the walk-in latch to an unlocking position by rotation of the carrier drum in a first direction, and a second cable having one end connected to a folder-lock latch selectively constraining a folding operation of the sheet and another end disposed movably along the second guideline and moving the folder-lock latch to an unlocking position by rotation of the carrier drum in a second direction.

However, the prior art connected a separate distributor to one of the first cable and the second cable when being installed in a vehicle providing a function for simultaneously moving the walk-in latch and the folder-lock latch to an unlocking position. Here, as the distributor has two output cables, and the two output cables are connected to the walk-in latch and the folder lock latch one by one, the walk-in latch and the folder lock latch may be simultaneously released, when the distributor is connected to one of the first cable and the second cable and is pulled.

Therefore, there was a problem in the prior art in that installation in a vehicle is cumbersome, since the distributor had to be separately provided in order to be installed in a vehicle providing a function of simultaneously moving the walk-in latch and the folder-lock latch to an unlocking position.

In addition, in the prior art, there is also a problem in that weight and cost due to a plurality of parts increase, since the reduction unit is composed of a sun gear, a ring gear, and a plurality of planetary gears, and is provided with the carrier drum.

In addition, in the prior art, there was also a problem of twisting and sagging of the first cable and the second cable when rotation of the carrier drum in one direction and another direction is repeatedly used, since the first cable and the second cable are provided together on one side of the carrier drum.

SUMMARY

An object of the present disclosure is to provide a dual release actuator for a vehicle seat capable of simultaneously releasing a walk-in latch and a folder-lock latch without connecting a separate distributor.

Another problem to be solved by the present disclosure is, providing a dual release actuator for vehicle seats that can reduce weight and cost by using a minimum number of gears, and can prevent twisting and sagging of cables by providing cables on both sides of the worm wheel gear, respectively.

Technical problems of the present disclosure are not limited to the aforementioned problems, and those skilled in the art to which the present disclosure pertains may evidently understand other technical problems from the following description.

One embodiment is a dual release actuator for a vehicle seat, including: a motor, a worm gear, a worm wheel gear, a first latch release cable, a second latch release cable and a third latch release cable. The worm gear is coupled to a rotary shaft of the motor. The worm wheel gear is tooth-meshed with the worm gear. A first disk portion protrudes from a center of one side of the worm wheel gear. A second disk portion protrudes from a center of another side the worm wheel gear. The first latch release cable is wound or unwound on an outer circumferential surface of the first disk portion when the worm wheel gear rotates in one direction. The second latch release cable is wound or unwound along with the first latch release cable on the outer circumferential surface of the first disk portion when the worm wheel gear rotates in one direction. The third latch release cable is wound or unwound on an outer circumferential surface of the second disk portion when the worm wheel gear rotates in another direction.

An arc-shaped first slider guide groove may be formed on a side surface of the first disk portion. An arc-shaped second slider guide groove may be formed on a side surface of the second disk portion. An end of the first latch release cable and an end of the second latch release cable may be connected by a first slider. The first slider may be inserted into the first slider guide groove and movably disposed therein. A second slider may be inserted into the second slider guide groove and movably disposed therein.

An arc-shaped first cable guide groove may be further formed on a side surface of the first disk portion. The first cable guide groove may extend from an end of the first slider guide groove to an outer circumferential surface of the first disk portion. The first cable guide groove may allow the first latch release cable and the second latch release cable being inserted thereinto and movably disposed therein. An arc-shaped second cable guide groove may be further formed on a side surface of the second disk portion. The second cable guide groove may extend from an end of the second slider guide groove to an outer circumferential surface of the second disk portion. The second cable guide groove may allow the third latch release cable being inserted thereinto and movably disposed therein.

The first latch release cable and the second latch release cable may exit out of a circumference of the worm wheel gear at a position closer to another end of the first slider guide groove than to the one end of the first slider guide groove. The third latch release cable may exit out of a circumference of the worm wheel gear at a position closer to another end of the second slider guide groove than to the one end of the second slider guide groove.

The first slider guide groove and the second slider guide groove may be located opposite to each other.

A direction in which the first latch release cable and the second latch release cable are wound on an outer circumferential surface of the first disk portion and a direction in which the third latch release cable is wound on an outer circumferential surface of the second disk portion may be opposite to each other.

When the motor is not operated, the first latch release cable and the second latch release cable may be disposed in a state of being wound on a portion of an outer circumferential surface of the first disk portion, and the third latch release cable may be disposed in a state of being wound on a portion of an outer circumferential surface of the second disk portion.

The dual release actuator for a vehicle seat may further include: a case and a cover. The case may have a worm gear accommodating portion and a worm wheel gear accommodating portion. The worm gear accommodating portion may allow the motor being installed on an outside thereof. The worm gear accommodating portion may accommodate the worm gear therein. The worm wheel gear accommodating portion may accommodate the worm wheel gear therein. The cover may cover an open side of the worm wheel gear accommodating portion.

A first exit and a second exit may be formed in the worm wheel gear accommodating portion. The first exit may be an exit of the first latch release cable and the second latch release cable. The second exit may be an exit of the third latch release cable. The cover may further cover an open side of the first exit and an open side of the second exit.

In the cover, an exit determining groove and an exit determining protrusion may formed. The exit determining groove may determine the first exit in a portion covering the open side of the first exit. The exit determining protrusion may determine the second exit by being formed in a portion covering the open side of the second exit and inserted into the open side of the second exit.

The dual release actuator for a vehicle seat according to the present disclosure may further include a first cable tube, a second cable tube and a third cable tube. One end of the first cable tube may be coupled to the first exit. The first cable tube may protrude outward from the worm wheel gear accommodating portion. The first cable tube may guide the first latch release cable. One end of the second cable tube may be coupled to the first exit. The second cable tube may protrude outward from the worm wheel gear accommodating portion. The second cable tube may guide the second latch release cable. One end of the third cable tube may be couple to the second exit. The third cable tube may protrude outward from the worm wheel gear accommodating portion. The third cable tube may guide the third latch release cable.

The dual release actuator for a vehicle seat according to the present disclosure may further include: a cable tube coupling unit. The cable tube coupling unit may include the first cable tube and the second cable tube into the first exit. The cable tube coupling unit may include: a case coupling portion, a first cable tube coupling portion and a second cable tube coupling portion. The case coupling portion may protrude from one side and be coupled to an inside of the first exit. The first latch release cable and the second latch release cable may be inserted into the case coupling portion. The first cable tube coupling portion may protrude from another side of the cable tube coupling unit. One end of the first cable tube may be coupled to an inside of the first cable tube coupling portion. The second cable tube coupling portion may protrude from another side of the cable tube coupling unit. The second cable tube coupling portion may be disposed in parallel with the first cable tube coupling portion. One end of the second cable tube may be coupled to the inside of the second cable tube coupling portion.

In the cover, a circular first disk portion insertion groove and a straight third cable guide groove may be formed. The first disk portion insertion groove may allow an end portion of the first disk portion being inserted thereinto and rotatably disposed therein. The third cable guide groove may extend from the first disk insertion groove to the first exit and guide the first latch release cable and the second latch release cable to the first exit. In the worm wheel gear accommodating portion, a circular second disk portion insertion groove and a straight fourth cable guide groove may be formed. The second disk portion insertion groove may allow an end portion of the second disk portion being inserted thereinto and rotatably disposed therein. The fourth cable guide groove may extend from the second disk insertion groove to the second exit and guide the third latch release cable to the second exit.

A first rotary shaft boss may protrude from a center of the first disk portion insertion groove. The first rotary shaft boss may have a first rotary shaft insertion groove. A second rotary shaft boss may protrude from a center of the second disk portion insertion groove. The second rotary shaft boss may have a second rotary shaft insertion groove. A first boss insertion groove may be formed at a center of the first disk portion. The first rotary shaft boss may be inserted into the first boss insertion groove. A second boss insertion groove may be formed at a center of the second disk portion. The second rotary shaft boss may be inserted into second boss insertion groove. In the worm wheel gear, a worm wheel gear rotary shaft may be formed. One end of the worm wheel gear rotary shaft may protrude from a center of the first boss insertion groove. One end of the worm wheel gear rotary shaft may be inserted into and rotatably disposed in the first rotary shaft insertion groove. Another end of the worm wheel gear rotary shaft may protrude from a center of the second boss insertion groove. Another end of the worm wheel gear rotary shaft may be inserted into and rotatably disposed in the second rotary shaft insertion groove.

The first exit and the second exit may be open in the same direction.

A ring-shaped spring insertion groove surrounding the first disk portion may be formed on one side of the worm wheel gear. In the spring insertion groove, an arc-shaped first stop shaft guide hole and an arc-shaped second stop shaft guide hole may be formed. The first stop shaft guide hole may pass through another side of the worm wheel gear. The second stop shaft guide hole may pass through another side of the worm wheel gear. The second stop shaft guide hole may be disposed opposite to the first stop shaft guide hole with respect to a center of the worm wheel gear. A ring-shaped coil spring may be inserted into the spring insertion groove. The coil spring may rotate the worm wheel gear to its original position. The dual release actuator for a vehicle seat according to the present disclosure may further include: a first stop shaft and a second stop shaft. The first stop shaft may pass through the spring insertion groove, the coil spring, and the first stop shaft guide hole. Both ends of the first stop shaft may be respectively fixed to the worm wheel gear accommodating portion and the cover. The first stop shaft may prevent rotation of the worm wheel gear during maximum rotation of the worm wheel gear in both directions. The second stop shaft may pass through the spring insertion groove, the coil spring, and the second stop shaft guide hole. Both ends of the second stop shaft may be respectively fixed to the worm wheel gear accommodating portion and the cover. The second stop shaft may prevent rotation of the worm wheel gear during maximum rotation of the worm wheel gear in both directions.

In the cover, a first stop shaft fixing groove and a second stop shaft fixing groove may be formed. One end of the first stop shaft may be inserted into and fixed to the first stop shaft fixing groove. One end of the second stop shaft may be inserted into and fixed to the second stop shaft fixing groove. In the worm wheel gear accommodating portion, a third stop shaft fixing groove and a fourth stop shaft fixing groove may be formed. Another end of the first stop shaft may be inserted into and fixed to the third stop shaft fixing groove. Another end of the second stop shaft may be inserted into and fixed to the fourth stop shaft fixing groove.

In the cover, a stop groove may be further formed on a radially outer side from the first stop shaft fixing groove and the second stop shaft fixing groove. On one side of the worm wheel gear, an arc-shaped stop protrusion may be further formed on a radially outer side from the spring insertion groove. The stop protrusion may be inserted into the stop groove and prevent rotation of the worm wheel gear during maximum rotation of the worm wheel gear in both directions.

Other embodiment specifics are included in the detailed description and drawings.

BRIEF DESCRIPTION OF THE DRAWINGS

FIG. 1 is a perspective view of one side of a dual release actuator for a vehicle seat according to an embodiment of the present disclosure.

FIG. 2 is a perspective view of the other side of FIG. 1,

FIG. 3 is an exploded perspective view of FIG. 1,

FIG. 4 is a perspective view of the other side of FIG. 3,

FIG. 5 is a cut-away perspective view of FIG. 1,

FIG. 6 is an enlarged view of the worm wheel gear illustrated in FIG. 3, FIG. 7 is a side view of the worm wheel gear illustrated in FIG. 6, FIG. 8 is a perspective view of the other side of FIG. 6, FIG. 9 is the other side view of the worm wheel gear illustrated in FIG. 8, FIG. 10 is an enlarged view of a cover illustrated in FIG. 4, FIG. 11 is an enlarged view of a case illustrated in FIG. 3, FIG. 12 is a perspective view showing a state in which a first cable tube and a second cable tube illustrated in FIGS. 1 to 4 are installed into a first exit formed in the worm wheel gear accommodating portion of the case through a cable tube coupling unit, FIG. 13 is an assembled perspective view of the cable tube coupling unit illustrated in FIG. 12, FIG. 14 is an exploded perspective view of the cable tube coupling unit illustrated in FIG. 12.

DETAILED DESCRIPTION

Hereinafter, a dual release actuator for a vehicle seat according to an embodiment of the present disclosure will be described with reference to the drawings.

FIG. 1 is a perspective view of one side of a dual release actuator for a vehicle seat according to an embodiment of the present disclosure, FIG. 2 is a perspective view of the other side of FIG. 1, FIG. 3 is an exploded perspective view of FIG. 1, and FIG. 4 is a perspective view of the other side of FIG. 3.

Referring to FIGS. 1 to 4, the dual release actuator 1 for a vehicle seat according to the embodiment of the present disclosure may be installed in a seat frame provided in a vehicle seat, and may release the walk-in latch and the folder-lock latch described in the background of the disclosure. The dual release actuator 1 for a vehicle seat according to the embodiment of the present disclosure may include a motor 100 and a housing 200.

The motor 100 may be a drive power source of the actuator 1. The motor 100 may be an electric motor operated on electric energy. The motor 100 may be installed protruding from an outside of the housing 200.

The housing 200 may include a case 210 and a cover 220.

A worm gear 300 and a worm wheel gear 400 may be accommodated inside the case 210. Here, the worm gear 300 may be coupled to a rotary shaft 110 of the motor 100, and the worm wheel gear 400 may be tooth-meshed with the worm gear 300.

The case 210 may include a worm gear accommodating portion 210A in which the worm gear 300 is accommodated and a worm wheel gear accommodating portion 210B in which the worm wheel gear 400 is accommodated.

The motor 100 may be installed outside the worm gear accommodating portion 210A. The motor 100 may be fastened to the worm gear accommodating portion 210A through a plurality of bolts. The rotary shaft 110 of the motor 100 may be rotatably installed inside the worm gear accommodating portion 210A. The rotary shaft 110 of the motor 100 may be rotatably installed inside the worm gear accommodating portion 210A through a plurality of bearings. The worm gear 300 may be installed on an outer circumferential surface of the rotary shaft 110 of the motor 100.

A plurality of gear tooth that are tooth-meshed with the worm gear 300 may be formed on an entire outer circumferential surface of the worm wheel gear 400. Of course, a plurality of gear tooth tooth-meshed with the worm gear 300 may be formed in a portion of an outer circumferential surface of the worm wheel gear 400. A gear tooth-meshing hole 212 communicating with an inner circumferential surface of the worm gear accommodating portion 210A may be formed on an inner circumferential surface of the worm wheel gear accommodating portion 210B. The gear tooth of the worm gear 300 accommodated in the worm gear accommodating portion 210A and the gear tooth of the worm wheel gear 400 accommodated in the worm wheel gear accommodating portion 210B may be tooth-meshed with each other through the gear tooth-meshing hole 212.

One side of the worm wheel gear accommodating portion 210B may be open. The worm wheel gear accommodating portion 210B may be formed in a tubular shape with one side opened. The cover 220 may cover one open side of the worm wheel gear accommodating portion 210B. The cover 220 may be formed in a plate shape covering one open side of the worm wheel gear accommodating portion 210B.

A first latch release cable 500, a second latch release cable 550, and a third latch release cable 600 may be installed in the worm wheel gear 400. Here, the first latch release cable 500 may be connected to the walk-in latch described in the background art of the present disclosure, the second latch release cable 550 may be connected to the folder-lock latch described in the background art of the present disclosure, and the third latch release cable 600 may be connected to the folder-lock latch. That is, it is possible to unlock back-and-forth sliding of the seat when the walk-in latch is pulled by the first latch release cable 500, it is possible to unlock the folding of the seat when the folder-lock latch is pulled by the second latch release cable 550 or the third latch release cable 600. Of course, the third latch release cable 600 may be connected to a wonk-in latch. That is, the third latch release cable 600 may be connected to any one among the walk-in latch and the folder-lock latch.

The rotary shaft 110 of the motor 100 may be rotated in both directions. When the rotary shaft 110 of the motor 100 is rotated in one direction, the worm gear 300 is rotated in one direction along with the rotary shaft 110 of the motor 100, the worm wheel gear 400 is rotated in one direction by the one-direction rotation of the worm gear 300, and accordingly, as the first latch release cable 500 and the second latch release cable 550 are wound together on an outer circumferential surface of a first disk portion 410 (see FIGS. 6 and 7), the walk-in latch and the folder-lock latch are pulled at the same time, thereby unlocking the walk-in latch and the folder-lock latch. In addition, when the rotary shaft 110 of the motor 100 is rotated in the other direction, the worm gear 300 is rotated in the other direction along with the rotary shaft 110 of the motor 100, the worm wheel gear 400 is rotated in the other direction by the rotation of the worm gear 300 in the other direction, and accordingly, as the third latch release cable 600 is wound on an outer circumferential surface of a second disk portion 420 (see FIGS. 8 and 9), the folder-lock latch or the walk-in latch is pulled, thereby unlocking the third latch release cable 600. Here, a plurality of grooves are formed on each of side surfaces of the first disk portion 410 and the second disk portion 420, thereby weight of the worm wheel gear 400 may be reduced.

A plurality of first fastening ribs 211 may protrude from an outer circumferential surface of the worm wheel gear accommodating portion 210B, and a plurality of second fastening ribs 221 respectively corresponding to the plurality of first fastening ribs 211 may protrude from an outer circumference of the cover 220.

The cover 220 may be fastened to the plurality of first fastening ribs 211 through a plurality of fastening bolts 5 penetrating, respectively, the plurality of second fastening ribs 221. Specifically, after penetrating through fastening holes (reference numeral not indicated) formed in each of the plurality of second fastening ribs 221, the plurality of fastening bolts 5 may be inserted into and fastened to fastening grooves (reference numeral not indicated) respectively formed in the plurality of first fastening ribs 211. Through this, the cover 220 may cover the open side of the worm wheel gear accommodating portion 210B and be coupled to the worm wheel gear accommodating portion 210B.

Hereinafter, a structure installing the first latch release cable 500, the second latch release cable 550, and the third latch release cable 600 in the worm wheel gear 400, the cover 220, and the case 210 will be explained in detail.

FIG. 5 is a cut-away perspective view of FIG. 1, FIG. 6 is an enlarged view of the worm wheel gear illustrated in FIG. 3, and FIG. 7 is a side view of the worm wheel gear illustrated in FIG. 6.

Referring to FIGS. 5 to 7, the first disk portion 410 may protrude from a center of one side surface of the worm wheel gear 400. An arc-shaped first slider guide groove 411 may be formed on a side surface of the first disk portion 410.

An end of the first latch release cable 500 and an end of the second latch release cable 550 may be connected by a first slider 510 by a die casting method. The first slider 510 may be movably disposed by being inserted into the first slider guide groove 411. The first slider 510 is formed in a cylindrical shape to minimize noise generation.

When the worm wheel gear 400 rotates in one direction, the first latch release cable 500 and the second latch release cable 550 may be wound or unwound on an outer circumferential surface of the first disk portion 410. For example, in a state shown in FIG. 7, when the worm wheel gear 400 is rotated counterclockwise, the first latch release cable 500 and the second latch release cable 550 may be wound on an outer circumference of the first disk portion 410, and when the worm wheel gear 400 is rotated clockwise, the first latch release cable 500 and the second latch release cable 550 may be unwound on an outer circumference of the first disk portion 410.

An arc-shaped first cable guide groove 412 may be further formed on a side surface of the first disk portion 410. The first cable guide groove 412 may extend from one end of the first slider guide groove 411 to an outer circumferential surface of the first disk portion 410. The first latch release cable 500 and a second latch release cable 550 may be inserted into the first cable guide groove 412 to be movably disposed. The first slider 510 has a larger diameter than the first cable guide groove 412 and may not move inside the first cable guide groove 412.

The first latch release cable 500 and the second latch release cable 550 may exit out of a circumference of the worm wheel gear 400 at a position closer to another end of the first slider guide groove 411 than to the one end of the first slider guide groove 411.

When the motor 100 is not operated, the first latch release cable 500 and the second latch release cable 550 may be disposed in a state of being wound on a portion of an outer circumferential surface of the first disk portion 410. Through this, it is possible to prevent the first latch release cable 500 and the second latch release cable 550 from being twisted when the worm wheel gear 400 rotates.

FIG. 8 is a perspective view of the other side of FIG. 6, and FIG. 9 is the other side view of the worm wheel gear illustrated in FIG. 8.

Referring to FIGS. 5, 8 and 9, the second disk portion 420 may protrude from a center of the other side surface of the worm wheel gear 400. An arc-shaped second slider guide groove 421 may be formed on a side surface of the second disk portion 420.

A second slider 610 may be connected to an end of the third latch release cable 600 by a die casting method. The second slider 610 may be inserted into the second slider guide groove 421 to be movably disposed. The second slider 610 may be formed in a cylindrical shape to minimize noise generation.

When the worm wheel gear 400 rotates in another direction, the third latch release cable 600 may be wound or unwound on an outer circumferential surface of the second disk portion 420. For example, in a state shown in FIG. 9, when the worm wheel gear 400 is rotated counterclockwise, the third latch release cable 600 may be wound on an outer circumference of the second disk portion 420, and when the worm wheel gear 400 is rotated clockwise, the third latch release cable 600 may be unwound on an outer circumference of the second disk portion 420.

An arc-shaped second cable guide groove 422 may be further formed on a side surface of the second disk portion 420. The second cable guide groove 422 may extend from one end of the second slider guide groove 421 to an outer circumferential surface of the second disk portion 420. The third latch release cable 600 may be inserted into the second cable guide groove 422 to be movably disposed. The second slider 610 has a larger diameter than the second cable guide groove 422 and may not be moved toward an inside the second cable guide groove 422.

The third latch release cable 600 may exit out of a circumference of the worm wheel gear 400 at a position closer to another end of the second slider guide groove 422 than to the one end of the second slider guide groove 421.

The second slider guide groove 421 may be located opposite to the first slider guide groove 411. That is, the first slider guide groove 411 and the second slider guide groove 421 may be located opposite to each other.

A direction in which the third latch release cable 600 is wound on an outer circumferential surface of the second disk portion 420 may be opposite to a direction in which the first latch release cable 500 is wound on an outer circumferential surface of the first disk portion 410. That is, the direction in which the first latch release cable 500 is wound on an outer circumferential surface of the first disk portion 410 and the direction in which the third latch release cable 600 is wound on an outer circumferential surface of the second disk portion 420 may be opposite to each other.

When the motor 100 is not operated, the third latch release cable 600 may be disposed in a state of being wound on a portion of an outer circumferential surface of the second disk portion 420. Through this, it is possible to prevent the third latch release cable 600 from being twisted when the worm wheel gear 400 rotates.

Meanwhile, in a state shown in FIG. 7, when the worm wheel gear 400 is rotated counterclockwise by a driving force of the motor 100, the first latch release cable 500 may be wound on an outer circumferential surface of the first disk portion 410. At this time, the second slider 610 of the third latch release cable 600 is moved along the second slider guide groove 421, thereby preventing the third latch release cable 600 from being twisted. In addition, when rotated clockwise by a driving force of the motor 100 in a state shown in FIG. 7, the third latch release cable 600 may be wound on an outer circumferential surface of the second disk portion 420. At this time, the first slider 510 of the first latch release cable 500 is moved along the first slider guide groove 411, thereby preventing the third latch release cable 600 from being twisted.

Referring to FIGS. 6 to 9, a ring-shaped spring insertion groove 430 surrounding the first disk portion 410 may be formed on one side surface of the worm wheel gear 400. A ring-shaped coil spring 800 may be inserted into the spring insertion groove 430. The coil spring 800 may be compressed by a first stop shaft 460 and a second stop shaft 470 when the worm wheel gear 400 is rotated in both directions by a driving force of the motor 100 and generate an elastic force, and when the motor 100 is stopped, the coil spring 800 may rotate the worm wheel gear 400 to its original position with the elastic force.

An arc-shaped first stop shaft guide hole 431 and an arc-shaped second stop shaft guide hole 432 may be formed in the spring insertion groove 430. The first stop shaft guide hole 431 may pass through to another side of the worm wheel gear 400. The second stop shaft guide hole 432 may pass through to another side of the worm wheel gear 400. The second stop shaft guide hole 432 may be disposed opposite to the first stop shaft guide hole 431 with respect to a center of the worm wheel gear 400. That is, the first stop shaft guide hole 431 and the second stop shaft guide hole 432 may be disposed on opposite sides to each other with respect to a center of the worm wheel gear 400.

The first stop shaft 460 may pass through the spring insertion groove 430, the coil spring 800, and the first stop shaft guide hole 431. Both ends of the first stop shaft 460 may be fixed to the worm wheel gear accommodating portion 210B of the case 210 and the cover 220, respectively. The first stop shaft 460 may stop rotation of the worm wheel gear 400 during maximum rotation of the worm wheel gear 400 in both directions. In addition, the first stop shaft 460 may generate an elastic force by compressing the coil spring 800 during maximum rotation of the worm wheel gear 400 in both directions.

The second stop shaft 470 may pass through the spring insertion groove 430, the coil spring 800, and the second stop shaft guide hole 432. Both ends of the second stop shaft 470 may be fixed to the worm wheel gear accommodating portion 210B of the case 210 and the cover 220, respectively. The second stop shaft 470 may stop rotation of the worm wheel gear 400 during maximum rotation of the worm wheel gear 400 in both directions. In addition, the second stop shaft 470 may generate an elastic force by compressing the coil spring 800 during maximum rotation of the worm wheel gear 400 in both directions.

FIG. 10 is an enlarged view of the cover illustrated in FIG. 4, and FIG. 11 is an enlarged view of the case illustrated in FIG. 3.

Referring to FIGS. 3 to 5 and FIGS. 10 and 11, in the worm wheel gear accommodating portion 210B of the case 210, a first exit 215 that is an exit of the first latch release cable 500 and the second latch release cable 550, and a second exit 216 that is an exit of the third latch release cable 600 may be formed. The first exit 215 and the second exit 216 may be open in the same direction.

The cover 220 may further cover an open side of the first exit 215 and an open side of the second exit 216.

An exit determining groove 225 and an exit determining protrusion 226 may be formed in the cover 220.

The exit determining groove 225 may be formed in a portion covering an open side of the first exit 215 to determine the first exit 215.

The exit determining protrusion 226 may be formed in a portion covering an open side of the second exit 216, and may be inserted into the open side of the second exit 216 to determine the second exit 216.

The first exit 215 determined by the exit determining groove 225 may be disposed closer to the cover 220 than to the second exit 216 determined by the exit determining protrusion 226.

One end of a first cable tube 520 and one end of a second cable tube 570 may be coupled to the first exit 215. A first coupling groove may be formed on outer circumferential surfaces of the ends of the first cable tube 520 and the second cable tube 570, and a first coupling protrusion that is inserted into the first coupling groove and coupled to an inside of the first exit 215 may be formed. Of course, in this embodiment, the first cable tube 520 and the second cable tube 570 are installed into the first exit 215 through a cable tube coupling unit 900, but may also be installed directly into the first exit 215 without the cable tube coupling unit 900.

The first cable tube 520 and the second cable tube 570 may be disposed to protrude outward from the worm wheel gear accommodating portion 210B. The first cable tube 520 may guide the first latch release cable 500, and the second cable tube 570 may guide the second latch release cable 550.

The first cable tube 520 may extend toward the walk-in latch and may be formed in a straight line or bent. The second cable tube 570 may extend toward the folder-lock latch and may be formed in a straight line or bent.

One end of the third cable tube 620 may be coupled to the second exit 216. A second coupling groove may be formed on an outer circumferential surface of the one end of the third cable tube 620, and a second coupling protrusion inserted into and coupled to the second coupling groove may be formed on an inside of the second exit 216. The third cable tube 620 may be formed to protrude outward from the worm wheel gear accommodating portion 210B. The third cable tube 620 may guide the third latch release cable 600. The third cable tube 620 may extend toward the folder-lock latch or the walk-in latch, and may be formed in a straight line or bent.

A first disk portion insertion groove 223 and a third cable guide groove 224 may be formed in the cover 220.

An end of the first disk portion 410 of the worm wheel gear 400 may be inserted into the first disk portion insertion groove 223 and rotatably disposed therein. The first disk portion insertion groove 223 may be formed in a circular shape.

The third cable guide groove 224 may extend from the first disk portion insertion groove 223 to the first exit 215 and guide the first latch release cable 500 and the second latch release cable 550 to the first exit 215. Through this, the third cable guide groove 224 may prevent the first latch release cable 500 and the second latch release cable 550 from being twisted when the worm wheel gear 400 rotates. The third cable guide groove 224 may be formed in a straight line.

A second disk portion insertion groove 213 and a fourth cable guide groove 214 may be formed in the worm wheel gear accommodating portion 210B of the case 210.

An end of the second disk portion 420 of the worm wheel gear 400 may be inserted into the second disk portion insertion groove 213 and rotatably disposed therein. The second disk portion insertion groove 213 may be formed in a circular shape.

The fourth cable guide groove 214 may extend from the second disk insertion groove 213 to the second exit 216 and guide the third latch release cable 600 to the second exit 216. Through this, the fourth cable guide groove 214 may prevent the third latch release cable 600 from being twisted when the worm wheel gear 400 rotates. The fourth cable guide groove 214 may be formed in a straight line.

A first stop shaft fixing groove 229A and a second stop shaft fixing groove 229B may be formed in the cover 220. One end of the first stop shaft 460 may be inserted into and fixed to the first stop shaft fixing groove 229A. One end of the second stop shaft 470 may be inserted into and fixed to the second stop shaft fixing groove 229B. A third stop shaft fixing groove 219A and a fourth stop shaft fixing groove 219B may be formed in the worm wheel gear accommodating portion 210B of the case 210. The other end of the first stop shaft 460 may be inserted into and fixed to the third stop shaft fixing groove 219A. The other end of the second stop shaft 470 may be inserted into and fixed to the fourth stop shaft fixing groove 219B.

A stop groove 229 may be further formed on a radially outer side from the first stop shaft fixing groove 229A and the second stop shaft fixing groove 229B in the cover 220.

On one side of the worm wheel gear 400, an arc-shaped stop protrusion 490 (see FIGS. 6 and 7) inserted into the stop groove 229 of the cover 220 may be further formed on a radially outer side from the spring insertion groove 430. The stop protrusion 490 may prevent rotation of the worm wheel gear 400 during maximum rotation of the worm wheel gear 400 in both directions.

Referring to FIGS. 5 to 11, a first rotary shaft boss 227 having a first rotary shaft insertion groove 227A may protrude from a center of the first disk portion insertion groove 223 of the cover 220.

A second rotary shaft boss 217 having a second rotary shaft insertion groove 217A may protrude from a center of the second disk portion insertion groove 213 of the worm wheel gear accommodating portion 210B of the case 210.

A first boss insertion groove 415 into which the first rotary shaft boss 227 of the cover 220 is inserted may be formed at a center of the first disk portion 410 of the worm wheel gear 400.

A second boss insertion groove 425 into which the second rotary shaft boss 217 of the case 210 is inserted may be formed at a center of the second disk portion 420 of the worm wheel gear 400.

A worm wheel gear rotary shaft 450 may be formed in the worm wheel gear 400. One end of the worm wheel gear rotary shaft 450 may protrude from a center of the first boss insertion groove 415 and be inserted into the first rotary shaft insertion groove 227A of the cover 220 to be rotatably disposed. The other end of the worm wheel gear rotary shaft 450 may protrude from a center of the second boss insertion groove 425 and be inserted into the second rotary shaft insertion groove 217A of the case 210 to be rotatably disposed.

Meanwhile, referring to FIGS. 1 to 4, the first cable tube 520 and the second cable tube 570 may be coupled to the housing 200 through the cable tube coupling unit 900. This will be described below with reference to FIGS. 12 to 14.

FIG. 12 is a perspective view showing a state in which the first cable tube and the second cable tube illustrated in FIGS. 1 to 4 are installed into the first exit formed in the worm wheel gear accommodating portion of the case through the cable tube coupling unit, FIG. 13 is an assembled perspective view of the cable tube coupling unit illustrated in FIG.

12, and FIG. 14 is an exploded perspective view of the cable tube coupling unit illustrated in FIG. 12.

Referring to FIGS. 1 to 4 and 11 to 14, the cable tube coupling unit 900 may be further installed at the first exit 215 in the worm wheel gear accommodating portion 210B of the case 210. The first cable tube 520 and the second cable tube 570 may be installed into the first exit 215 through the cable tube coupling unit 900. That is, the cable tube coupling unit 900 may install the first cable tube 520 and the second cable tube 570 into the first exit 215.

From one side of the cable tube coupling unit 900, a case coupling portion 910 may protrude, and from the other side of the cable tube coupling unit 900, a first cable tube coupling portion 920 and a second cable tube coupling portion 930 may protrude. Here, the first cable tube coupling portion 920 and the second cable tube coupling portion 930 may be disposed parallel to each other and may have the same size and shape.

The case coupling portion 910 may be coupled to an inside of the first exit 215. To this end, coupling grooves 911 may be formed continuously in a circumferential direction on an outer circumferential surface of the case coupling portion 910, and coupling protrusions (reference numerals not indicated) to be inserted into the coupling grooves 911 may be formed on an inner surface of the first exit 215.

The first latch release cable 500 and the second latch release cable 550 may be inserted into the case coupling portion 910 and movably disposed.

One end of the first cable tube coupling portion 920 may be coupled to an inside of the first cable tube 520. To this end, the coupling grooves 521 may be continuously formed in a circumferential direction on an outer circumferential surface of the first cable tube 520, and coupling protrusions (reference numerals not indicated) inserted into the coupling grooves 521 may be formed on an inner surface of the cable tube coupling unit 900.

One end of the first cable tube 520 may be disposed inside the first cable tube coupling portion 920, and the other end of the first cable tube 520 may protrude outward from the first cable tube coupling portion 920.

One end of the second cable tube 570 may be coupled to an inside of the second cable tube coupling portion 930. To this end, the coupling grooves 571 may be continuously formed in a circumferential direction on an outer circumferential surface of the second cable tube 570, and coupling protrusions (reference numerals not indicated) inserted into the coupling grooves 571 may be formed on an inner surface of the cable tube coupling unit 900.

One end of the second cable tube 570 may be disposed inside the second cable tube coupling portion 930, and the other end of the second cable tube 570 may protrude outward from the second cable tube coupling portion 930.

The cable tube coupling unit 900 may consist of two pieces 940 and 950. That is, the cable tube coupling unit 900 may include a first piece 940 and a second piece 950. One half of the case coupling portion 910 may be formed on one side of the first piece 940, and the other half of the case coupling portion 910 may be formed on one side of the second piece 950. In addition, one half of the first cable tube coupling portion 920 and one half of the second cable tube coupling portion 930 may be formed on the other side of the first piece 940, and the other half of the first cable tube coupling portion 920 and the other half of the second cable tube coupling portion 930 may be formed on the other side of the second piece 950.

Hook grooves 945 may be formed on both sides opposite to each other in the first piece 940, and hook protrusions 955 hooked to the hook grooves 945 may be formed on both sides opposite to each other in the second piece 950. As the hook protrusions 955 on both sides are hook-coupled to the hook grooves 945 on both sides, the first piece 940 and the second piece 950 may be coupled to each other.

A position of the walk-in latch and a position of the folder-lock latch installed on a vehicle seat frame may be different depending on a type of a vehicle. Accordingly, the first cable tube 520, the second cable tube 570, and the third cable tube 620 may be formed in a straight line shape or bent so as to extend toward a location of the walk-in latch or the folder-lock latch. As the cable tube coupling unit 900 consists of the first piece 940 and the second piece 950 hook-coupled together, it is possible to easily change the first cable tube 520 and the second cable tube 570 having shapes suitable for a position of the walk-in latch and a position of the folder-lock latch installed on a vehicle seat frame. In addition, it is possible that the dual release actuator 1 for a vehicle seat according to the embodiment of the present disclosure may easily change the cable tube coupling unit 900 to have only one among the first latch release cable 500 and the second latch release cable 550 to be installed on other kinds of vehicles.

The operation of the dual release actuator 1 for a vehicle seat according to the embodiment of the present disclosure configured as described above will be described below.

First, when the motor 100 is driven and the rotary shaft 110 of the motor 100 is rotated in one direction, the worm gear 300 is rotated in one direction and the worm wheel gear 400 is rotated in one direction. Accordingly, the first latch release cable 500 and the second latch release cable 550 are wound on an outer circumferential surface of the first disk portion 410 and pull the walk-in latch and the folder-lock latch, thereby releasing them. At this time, the third latch release cable 600 is released from an outer circumferential surface of the second disk portion 420, but since the second slider 610 provided at an end of the third latch release cable 600 is moved along the second slider guide groove 421, the third latch release cable 600 is not twisted.

Conversely, when the motor 100 is driven and the rotary shaft 110 of the motor 100 is rotated in another direction, the worm gear 300 is rotated in another direction and the worm wheel gear 400 is rotated in another direction. Accordingly, the third latch release cable 600 is wound on an outer circumferential surface of the second disk portion 420 and pulls the walk-in latch or the folder-lock latch, thereby releasing the walk-in latch or the folder-lock latch. At this time, the first latch release cable 500 and the second latch release cable 550 are released from an outer circumferential surface of the first disk portion 410, but since the first slider 510 provided at ends of the first latch release cable 500 and the second latch release cable 550 is moved along the first slider guide groove 411, the first latch release cable 500 is not twisted.

As described above, in the dual release actuator 1 for a vehicle seat according to the embodiment of the present disclosure, since the first latch release cable 500 and the second latch release cable 550 are disposed on one side of the worm wheel gear 400 and the third latch release cable 600 is disposed on another side of the worm wheel gear 400, the walk-in latch and the folder-lock latch may be simultaneously released using the first latch release cable 500 and the second latch release cable 550 without connecting a separate distributor.

In addition, since the dual release actuator 1 for a vehicle seat according to the embodiment of the present disclosure uses only two gears, the worm gear 300 and the worm wheel gear 400 as latch release operation gears, weight and cost may be reduced.

In addition, in the dual release actuator 1 for a vehicle seat according to the embodiment of the present disclosure, since the first latch release cable 500 and the second latch release cable 550 are disposed on one side of the worm wheel gear 400, and the third latch release cable 600 is disposed another side of the worm wheel gear 400, twisting and sagging of the first latch release cable 500, the second latch release cable 550, and the third latch release cable 600 may be prevented.

In addition, in the dual release actuator 1 for a vehicle seat according to the embodiment of the present disclosure, since the first cable tube 520 and the second cable tube 570 are installed in the housing 200 through the cable tube coupling unit 900, and the first cable tube 520 and the second cable tube 570 in a form suitable for a position of the walk-in latch and a position of the folder-lock latch may be coupled to the cable tube coupling unit 900 and used, the dual release actuator 1 for a vehicle seat according to the embodiment of the present disclosure may be installed in various types of vehicles.

In the dual release actuator for a vehicle seat according to the present disclosure, since the first latch release cable and the second latch release cable are disposed on one side of the worm wheel gear and the third latch release cable is disposed on another side of the worm wheel gear, the walk-in latch and the folder-lock latch may be simultaneously released using the first latch release cable and the second latch release cable without connecting a separate distributor.

In addition, since the dual release actuator for a vehicle seat according to the present disclosure uses only two gears, a worm gear and a worm wheel gear, as latch release operating gears, weight and cost may be reduced.

In addition, in the dual release actuator for a vehicle seat according to the present disclosure, since the first latch release cable and the second latch release cable are disposed on one side of the worm wheel gear and the third latch release cable is disposed on another side of the worm wheel gear, twisting and sagging of the first latch release cable, the second latch release cable, and the third latch release cable may be prevented.

In addition, the dual release actuator for a vehicle seat according to the present disclosure may be installed in various types of vehicles, since a first cable tube and a second cable tube are installed in a housing through a cable tube coupling unit, and the first cable tube and the second cable tube having shapes suitable for a position of the walk-in latch and a position of the folder-lock latch may be coupled to the cable tube coupling unit.

The advantageous effects of the present disclosure are not limited to the aforementioned effects, and those skilled in the art to which the present disclosure pertains may evidently understand other effects from the description of claims.

Those skilled in the art would understand that the present disclosure described herein may be implemented in other concrete forms without departing from the technical concept or essential features thereof. Thus, it should be understood that embodiments described hereinabove are examples in all aspects, and do not limit the present disclosure. Further, the scope of the present disclosure will be denoted by the claims that are provided hereinbelow, rather than the detailed description. In addition, it should be construed that all modifications or variations that are derived from the meaning, scope and the concept of equivalence of the claims are covered in the scope of the present disclosure.

| REFERENCE NUMERALS | |
| --- | --- |
| 100: motor | 110: rotary shaft of a motor |
| 210: case | 210A: worm gear accommodating portion |
| 210B: worm wheel gear accommodating portion | |
| 213: second disk portion insertion groove | |
| 214: fourth cable guide groove | 215: first exit |
| 216: second exit | 217: second rotary shaft boss |
| 217A: second rotary shaft insertion groove | |
| 219A: third stop shaft fixing groove | |
| 219B: fourth stop shaft fixing groove | 220: cover |
| 223: first disk portion insertion groove | |
| 224: third cable guide groove | |
| 225: exit determining groove | 226: exit determining protrusion |
| 227: first rotary shaft boss | |
| 227A: first rotary shaft insertion groove | |
| 229: stop groove | 229A: first stop shaft fixing groove |
| 229B: second stop shaft fixing groove | 300: worm gear |
| 400: worm wheel gear | 410: first disk portion |
| 411: first slider guide groove | 412: first cable guide groove |
| 415: first boss insertion groove | 420: second disk portion |
| 421: second slider guide groove | 422: second cable guide groove |
| 425: second boss insertion groove | 430: spring insertion groove |
| 431: first stop shaft guide hole | |
| 432: second first stop shaft guide hole | |
| 450: worm wheel gear rotary shaft | 460: first stop shaft |
| 470: second stop shaft | 490: stop protrusion |
| 500: first latch release cable | 510: first slider |
| 520: first cable tube | 550: second latch release cable |
| 570: second cable tube | 600: third latch release cable |
| 610: second slider | 620: third cable tube |
| 800: coil spring | 900: cable tube coupling unit |
| 910: case coupling portion | 920: first cable tube coupling portion |
| 930: second cable tube coupling portion | |

What is claimed is:

1. A dual release actuator for a vehicle seat, comprising:
a motor;
a worm gear coupled to a rotary shaft of the motor;
a worm wheel gear tooth-meshed with the worm gear and having a first disk portion protruding from a center of one side thereof and a second disk portion protruding from a center of another side thereof;
a first latch release cable wound or unwound on an outer circumferential surface of the first disk portion when the worm wheel gear rotates in one direction;
a second latch release cable wound or unwound concurrently with the first latch release cable on the outer circumferential surface of the first disk portion when the worm wheel gear rotates in the one direction; and
a third latch release cable wound or unwound on an outer circumferential surface of the second disk portion when the worm wheel gear rotates in another direction.

2. The dual release actuator for a vehicle seat of claim 1,
wherein an arc-shaped first slider guide groove is formed on a side surface of the first disk portion;
an arc-shaped second slider guide groove is formed on a side surface of the second disk portion;
an end of the first latch release cable and an end of the second latch release cable are connected by a first slider inserted into and movably disposed in the first slider guide groove; and
an end of the third latch release cable is connected to a second slider inserted into and movably disposed in the second slider guide groove.

3. The dual release actuator for a vehicle seat of claim 2,
wherein an arc-shaped first cable guide groove extending from one end of the first slider guide groove to an outer circumferential surface of the first disk portion; and allowing the first latch release cable and the second latch release cable to be inserted thereinto and movably disposed therein is further formed on a side surface of the first disk portion; and
an arc-shaped second cable guide groove extending from one end of the second slider guide groove to an outer circumferential surface of the second disk portion; and allowing the third latch release cable to be inserted thereinto and movably disposed therein is further formed on a side surface of the second disk portion.

4. The dual release actuator for a vehicle seat of claim 3,
wherein the first latch release cable and the second latch release cable exit out of a circumference of the worm wheel gear at a position closer to another end of the first slider guide groove than to the one end of the first slider guide groove, and
wherein the third latch release cable exits out of a circumference of the worm wheel gear at a position closer to another end of the second slider guide groove than to the one end of the second slider guide groove.

5. The dual release actuator for a vehicle seat of claim 2,
wherein the first slider guide groove and the second slider guide groove are located opposite to each other.

6. The dual release actuator for a vehicle seat of claim 5,
wherein a direction in which the first latch release cable and the second latch release cable are wound on an outer circumferential surface of the first disk portion and a direction in which the third latch release cable is wound on an outer circumferential surface of the second disk portion are opposite to each other.

7. The dual release actuator for a vehicle seat of claim 1,
wherein when the motor is not operated, the first latch release cable and the second latch release cable are disposed in a state of being wound on a portion of an outer circumferential surface of the first disk portion, and the third latch release cable is disposed in a state of being wound on a portion of an outer circumferential surface of the second disk portion.

8. The dual release actuator for a vehicle seat of claim 1, further comprising:
a case allowing the motor to be installed on an outside thereof and having a worm gear accommodating portion accommodating the worm gear therein and a worm wheel gear accommodating portion accommodating the worm wheel gear therein; and
a cover covering an open side of the worm wheel gear accommodating portion, and
wherein a first exit which is an exit of the first latch release cable and the second latch release cable; and a second exit which is an exit of the third latch release cable are formed in the worm wheel gear accommodating portion, and
wherein the cover further covers an open side of the first exit and an open side of the second exit.

9. The dual release actuator for a vehicle seat of claim 8,
wherein in the cover,
an exit determining groove for determining the first exit in a portion covering the open side of the first exit; and
an exit determining protrusion for determining the second exit by being inserted into the open side of the second exit in a portion covering the open side of the second exit are formed.

10. The dual release actuator for a vehicle seat of claim 8, further comprising:
a first cable tube having one end coupled to the first exit, protruding outward from the worm wheel gear accommodating portion and guiding the first latch release cable;
a second cable tube having one end coupled to the first exit, protruding outward from the worm wheel gear accommodating portion and guiding the second latch release cable; and
a third cable tube having one end coupled to the second exit, protruding outward from the worm wheel gear accommodating portion and guiding the third latch release cable.

11. The dual release actuator for a vehicle seat of claim 10, further comprising:
a cable tube coupling unit for installing the first cable tube and the second cable tube into the first exit,
wherein the cable tube coupling unit comprises:
a case coupling portion protruding from one side thereof, coupled to an inside of the first exit and into which the first latch release cable and the second latch release cable inserted;
a first cable tube coupling portion protruding from another side thereof and having one end of the first cable tube coupled to an inside thereof; and
a second cable tube coupling portion protruding from another side thereof, disposed in parallel with the first cable tube coupling portion and having one end of the second cable tube coupled to the inside thereof.

12. The dual release actuator for a vehicle seat of claim 8,
wherein in the cover,
a circular first disk portion insertion groove allowing an end portion of the first disk portion to be inserted thereinto and rotatably disposed therein; and a straight third cable guide groove extending from the first disk insertion groove to the first exit and guiding the first latch release cable and the second latch release cable to the first exit are formed, and wherein in the worm wheel gear accommodating portion, a circular second disk portion insertion groove allowing an end portion of the second disk portion to be inserted thereinto and rotatably disposed therein; and a straight fourth cable guide groove extending from the second disk insertion groove to the second exit and guiding the third latch release cable to the second exit are formed.

13. The dual release actuator for a vehicle seat of claim 12, wherein a first rotary shaft boss having a first rotary shaft insertion groove protrudes from a center of the first disk portion insertion groove, wherein a second rotary shaft boss having a second rotary shaft insertion groove protrudes from a center of the second disk portion insertion groove, wherein a first boss insertion groove into which the first rotary shaft boss is inserted is formed at a center of the first disk portion, wherein a second boss insertion groove into which the second rotary shaft boss is inserted is formed at a center of the second disk portion, and wherein in the worm wheel gear, a worm wheel gear rotary shaft having one end protruding from a center of the first boss insertion groove, inserted into and rotatably disposed in the first rotary shaft insertion groove; and another end protruding from a center of the second boss insertion groove, inserted into and rotatably disposed in the second rotary shaft insertion groove is formed.

14. The dual release actuator for a vehicle seat of claim 8, wherein the first exit and the second exit are open in the same direction.

15. The dual release actuator for a vehicle seat of claim 8, wherein a ring-shaped spring insertion groove surrounding the first disk portion is formed on one side of the worm wheel gear, wherein in the spring insertion groove, an arc-shaped first stop shaft guide hole passing through another side of the worm wheel gear; and an arc-shaped second stop shaft guide hole passing through another side of the worm wheel gear and disposed opposite to the first stop shaft guide hole with respect to a center of the worm wheel gear are formed, and wherein the dual release actuator for a vehicle seat further comprises:

a ring-shaped coil spring inserted into the spring insertion groove and rotating the worm wheel gear to its original position;

a first stop shaft having both ends respectively fixed to the worm wheel gear accommodating portion and the cover through the spring insertion groove, the coil spring, and the first stop shaft guide hole, and preventing rotation of the worm wheel gear during maximum rotation of the worm wheel gear in both directions; and a second stop shaft having both ends respectively fixed to the worm wheel gear accommodating portion and the cover through the spring insertion groove, the coil spring, and the second stop shaft guide hole, and preventing rotation of the worm wheel gear during maximum rotation of the worm wheel gear in both directions.

16. The dual release actuator for a vehicle seat of claim 15, wherein in the cover, a first stop shaft fixing groove allowing one end of the first stop shaft to be inserted thereinto and fixed thereto, and a second stop shaft fixing groove allowing one end of the second stop shaft to be inserted thereinto and fixed thereto are formed, and wherein in the worm wheel gear accommodating portion, a third stop shaft fixing groove allowing another end of the first stop shaft to be inserted thereinto and fixed thereto, and a fourth stop shaft fixing groove allowing another end of the second stop shaft to be inserted thereinto and fixed thereto are formed.

17. The dual release actuator for a vehicle seat of claim 16, wherein in the cover, a stop groove is further formed on a radially outer side from the first stop shaft fixing groove and the second stop shaft fixing groove, and wherein on one side of the worm wheel gear, an arc-shaped stop protrusion inserted into the stop groove and preventing rotation of the worm wheel gear during maximum rotation of the worm wheel gear in both directions is further formed on a radially outer side from the spring insertion groove.

* * * * *